US012587020B2

(12) United States Patent
Ledfelt et al.

(10) Patent No.: US 12,587,020 B2
(45) Date of Patent: Mar. 24, 2026

(54) POWER SUPPLY CIRCUIT AND A METHOD FOR CONTROLLING A POWER SUPPLY CIRCUIT

(71) Applicants: SCANIA CV AB, Södertälje (SE); MAN TRUCK & BUS SE, Munich (DE)

(72) Inventors: Gunnar Ledfelt, Nykvarn (SE); Lukas Rydén, Solna (SE); Mathias Eggeling, Augsburg (DE)

(73) Assignees: SCANIA CV AB, Södertälje (SE); MAN TRUCK & BUS SE, Munich (DE)

( * ) Notice: Subject to any disclaimer, the term of this patent is extended or adjusted under 35 U.S.C. 154(b) by 0 days.

(21) Appl. No.: 18/837,732

(22) PCT Filed: Feb. 16, 2023

(86) PCT No.: PCT/EP2023/053861
§ 371 (c)(1),
(2) Date: Aug. 12, 2024

(87) PCT Pub. No.: WO2023/156507
PCT Pub. Date: Aug. 24, 2023

(65) Prior Publication Data
US 2025/0149910 A1 May 8, 2025

(30) Foreign Application Priority Data
Feb. 17, 2022 (SE) .................................... 2250165-4

(51) Int. Cl.
*B60L 58/15* (2019.01)
*B60R 16/033* (2006.01)
(Continued)

(52) U.S. Cl.
CPC .......... *H02J 7/1423* (2013.01); *B60R 16/033* (2013.01); *H02H 7/20* (2013.01);
(Continued)

(58) Field of Classification Search
CPC ...... H02J 7/1423; H02J 7/00304; H02J 7/163; H02J 7/0013; H02J 7/00302;
(Continued)

(56) References Cited

U.S. PATENT DOCUMENTS

2010/0020453 A1* 1/2010 McCoy .............. H01H 71/1018
361/42
2019/0081489 A1* 3/2019 Gerber ................ H02J 7/00308
(Continued)

FOREIGN PATENT DOCUMENTS

JP 2016015246 * 1/2016
JP 2017197117 * 11/2017
(Continued)

OTHER PUBLICATIONS

International Search Report and Written Opinion dated May 9, 2023, from PCT Application No. PCT/EP2023/053861.

*Primary Examiner* — Rexford N Barnie
*Assistant Examiner* — Xuan Ly
(74) *Attorney, Agent, or Firm* — Joseph T. Leone; DeWitt LLP

(57) ABSTRACT

The present application relates to a power supply circuit of a vehicle, which power supply circuit comprises a first side (A) comprising a power source (14), a first battery pack (12) and first power consumers (16), a second side (B) connected in series with the first side (A), the second side (B) comprising a second battery pack (18) and second power consumers (20), an overload current breaker (22) provided between the first and the second side, said overload current
(Continued)

breaker (22) having a pre-determined threshold breaking current ($I_{Threshold}$) value, at which value the circuit is broken; a controller (24) connected to said power source for regulating voltage from said power source (14), the controller (24) being provided with said threshold breaking current ($I_{Threshold}$) value, the controller further being operatively connected to devices (26, 28) providing information related to a current ($I_{ch}$) through said overload current breaker (22). The controller (24) is arranged to determine a maximum permissible charging current ($I_{Permissible}$) value in relation to the threshold breaking current ($I_{Threshold}$) value; to set a low voltage (V) from said power source (14) for charging said second battery pack (18) at activation of said power source (14); to monitor, with the information from the devices (26, 28), the charging current ($I_{ch}$) through said overload current breaker (22) to the second battery pack (18) and to compare the charging current ($I_{ch}$) with the maximum permissible charging current ($I_{Permissible}$); to increase the voltage (V) of the power source (14) if the charging current ($I_{ch}$) is below the maximum permissible charging current ($I_{ch}{<}I_{Permissible}$); and to decrease the voltage (V) of the power source (14) if the charging current ($I_{ch}$) is the same as or above the maximum permissible current ($I_{ch}{\geq}I_{Permissible}$).

17 Claims, 3 Drawing Sheets

(51) Int. Cl.

| | | |
|---|---|---|
| *H02H 7/20* | (2006.01) | |
| *H02J 7/00* | (2006.01) | |
| *H02J 7/14* | (2006.01) | |
| *H02J 7/16* | (2006.01) | |
| *G07C 5/08* | (2006.01) | |

(52) U.S. Cl.
CPC .......... *H02J 7/00304* (2020.01); *H02J 7/163* (2013.01); *G07C 5/08* (2013.01)

(58) Field of Classification Search
CPC ...... H02J 2310/46; H02J 2310/48; H02J 7/14; B60R 16/033; H02H 7/20; H02H 9/001; G07C 5/08; B60L 58/18; B60L 58/15
USPC ........................................................ 307/10.1
See application file for complete search history.

(56) References Cited

U.S. PATENT DOCUMENTS

| | | | |
|---|---|---|---|
| 2019/0305581 A1 | 10/2019 | Kinoshita | |
| 2023/0114055 A1* | 4/2023 | Peeck | H02M 1/32 |
| | | | 323/271 |
| 2024/0243448 A1* | 7/2024 | Matsumoto | H01M 50/574 |

FOREIGN PATENT DOCUMENTS

| | | |
|---|---|---|
| JP | 2021112088 A | 8/2021 |
| WO | WO 2017188163 A1 | 11/2017 |

\* cited by examiner

POWER SUPPLY CIRCUIT AND A METHOD FOR CONTROLLING A POWER SUPPLY CIRCUIT

TECHNICAL AREA

The present application relates to vehicles provided with power supply circuits having double battery systems and a number of power consumers.

BACKGROUND OF INVENTION

Commercial vehicles such as lorries, semi-trailer trucks, busses are generally equipped with electrical power circuits comprising at least two energy-storing devices, generally battery packs. The electrical power circuits are usually divided in two sides, a first side comprising a first or main battery pack, a power source such as an alternator or a DC/DC-converter and a number of electrical consumers, which consumers typically are active during the operation of the vehicle. The second side usually comprises a second battery pack and a number of consumers, which consumers typically require electrical power for shorter periods of operation. The first and the second battery packs are charged by the power source. A fuse or breaker is often arranged between the first side and the second side for protecting the first side if there is a short circuit on the second side.

For this type of setup, there might be a risk that the fuse or breaker will unintentionally trip or break if the battery pack on the second side is deeply discharged when the vehicle is started and the power source starts to charge the battery packs, because the current to the second side over the fuse or breaker may be very high due to the charging demands from the battery pack on the second side, for instance if the battery pack on the second side is discharged.

One solution is then to increase the fuse or breaker so that it can withstand high currents without tripping. On the other hand, this might lead to the fuse or breaker not tripping or breaking if a short circuit occurs. There is thus a demand for ensuring that a deeply discharged battery pack on the second side can be safely charged without the fuse or breaker tripping and at the same time ensure that the first side is protected from short circuits occurring on the second side.

BRIEF DESCRIPTION OF INVENTION

The object of the present application is to ensure the operation of a power supply circuit described above. This object is obtained by the features of the independent patent claims. Preferable embodiments form the subject of the dependent patent claims.

This part has not been altered yet. It will be amended once we agree on the claims. According to one aspect, an electric power supply circuit of a vehicle is provided, which power supply circuit may comprise a first side comprising a power source, a first battery pack and first power consumers. The power supply circuit may comprise a second side connected in series with the first side, where the second side may comprise a second battery pack and second power consumers. Further, an overload current breaker may be provided between the first and the second side, where the overload current breaker may have a pre-determined threshold breaking current value, at which value the circuit is broken. A controller may be connected to the power source for regulating voltage from said power source, wherein the controller may be provided with the threshold breaking current value, the controller further being operatively connected to devices providing information related to a current through the overload current breaker.

The controller may be arranged to determine a maximum permissible charging current value in relation to the threshold breaking current value, and to set a low voltage from the power source for charging said second battery pack at activation of the power source, and monitoring, with the information from the devices, the charging current through the overload current breaker to the second battery pack and comparing the charging current with the maximum permissible charging current, wherein the controller increases the voltage of the power source if the charging current is below the maximum permissible charging current; and decreasing the voltage of the power source if the charging current is the same as or above the maximum permissible charging current.

With this solution, the risk of the overload current breaker breaking due to high charging currents for charging a very discharged battery pack on the second side is greatly reduced while at the same time the overload current breaker will break the current when a short circuit on the second side occurs, thereby protecting the first side.

In this regard, the maximum permissible current value may be determined to be below the threshold current value. Alternatively, the maximum permissible current value may be determined to be the same or above the threshold current value. Thus, the maximum permissible current is related to the threshold current but may be determined to be of different value depending on factors like for instance the type of overload current breaker and how fast or slow it reacts on overload currents.

The devices providing information relating to the current through the overload current breaker may comprise a shunt-based measuring device or a magnetic field-based measuring device connected to the circuit in the vicinity of the overload current breaker. The information of the current to the second side is then directly derivable by the devices arranged in the circuit. Moreover, in order to assure that the current does not flow from the second side to the first side, which may be the case if the power source is inactive and the battery pack on the first side is discharged, a rectifier may be connected in series with the overload current breaker, allowing current only to flow towards the second side. Otherwise, the battery pack on the second side could provide a charging current, which is unwanted, causing the battery pack on the second side to be discharged.

In this regard, the devices providing information through the overload current breaker may comprise a MOSFET-transistor based device, also allowing current only to flow towards the second side. Then the rectifier function is built in in the overload current breaker.

As an alternative, the devices providing information through the overload current breaker may comprise devices capable of measuring current to the second battery pack. With this solution, the controller may further comprise information regarding the current demand of the second consumers and wherein the controller is arranged to estimate the current through the overload current breaker based on the current demand and the current to the second battery pack. This solution has the advantage that information regarding the charging current is obtained, which information often is used in other applications.

The overload current breaker may comprise many different solutions such as thermal breaker, mechanical breaker, electronic breaker or combinations thereof. Moreover, the power supply may comprise one or several of alternators, DC/DC-converters, batteries or combinations thereof.

According to the application, it comprises a method for controlling a power supply circuit of a vehicle, which power supply circuit comprises a first side comprising a power source, a first battery pack and first power consumers, a second side connected in series with the first side, the second side comprising a second battery pack and second power consumers, and an overload current breaker provided between the first and the second side, where the overload current breaker has a pre-determined threshold breaking current value, at which value the circuit is broken.

The method may comprise the steps of determining a maximum permissible charging current value in relation to the threshold breaking current value, setting a low voltage from the power source for charging said second battery pack at activation of said power source, obtaining information related to a charging current over the overload current breaker; monitoring, with the information, the charging current through the overload current breaker to the second battery pack and comparing the current with the maximum permissible charging current; increasing the voltage of the power source if the charging current is below the maximum permissible charging current; and decreasing the voltage of the power source if the charging current is the same as or above the maximum permissible charging current.

Further, a controller is provided for controlling a power supply circuit of a vehicle arranged to perform the method. Also, a computer program product and a computer-readable storage medium is provided, comprising instructions which, when the program is executed by a computer, causes the computer to carry out the method.

These and other aspects of, and advantages with, the present invention will become apparent from the following detailed description of the invention and from the accompanying drawings.

BRIEF DESCRIPTION OF DRAWINGS

In the following detailed description of the invention, reference will be made to the accompanying drawings, of which

DETAILED DESCRIPTION OF THE INVENTION

Figure 1:
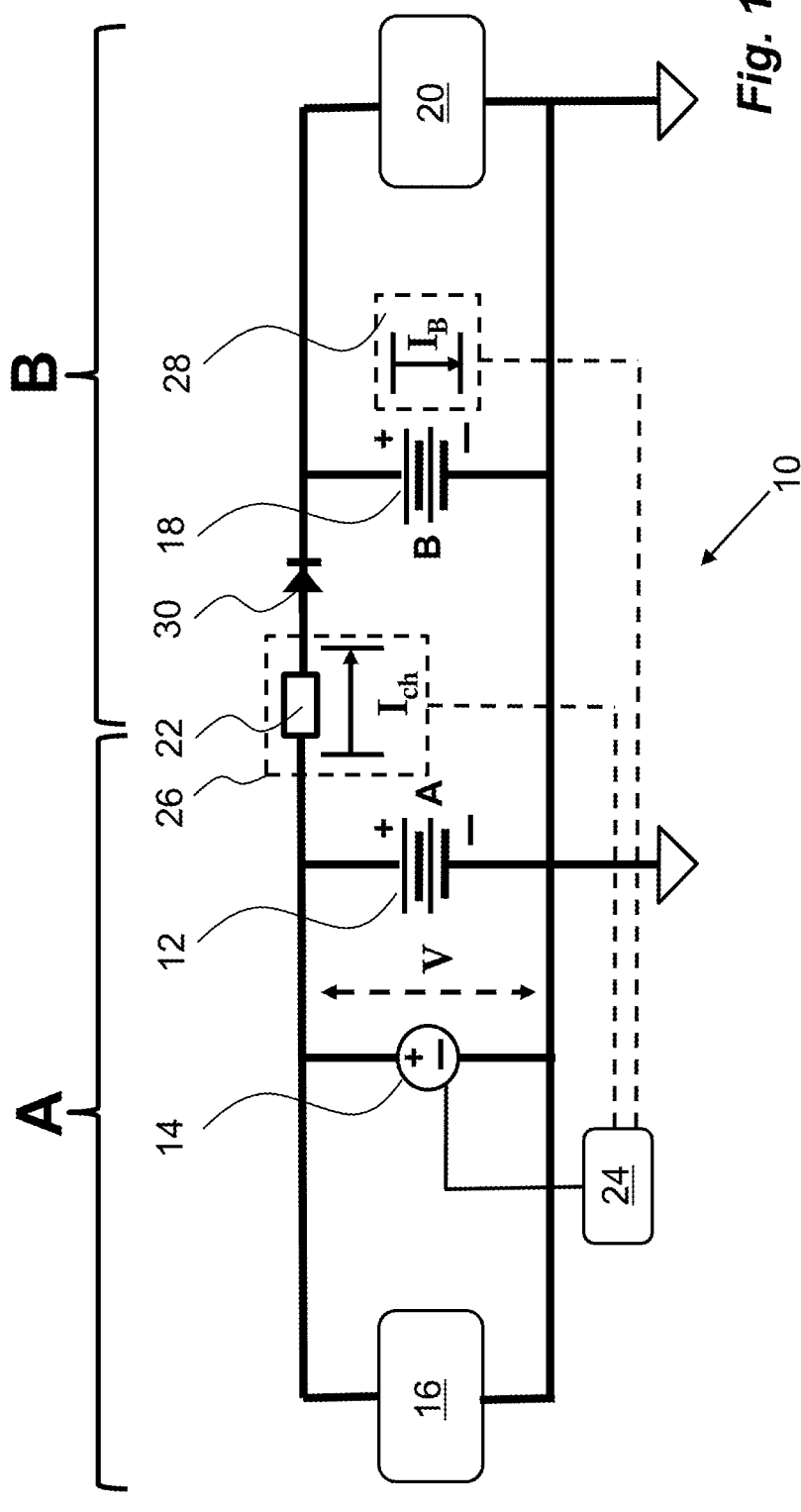
FIG. 1 is a schematic view of an electrical power supply circuit according to the application.

FIG. 1 shows an electrical power supply circuit 10 comprised in a vehicle. The electrical power supply circuit 10 comprises a first side A and a second side B. The first side A comprises a first battery pack 12, a power source 14 and a domain 16 comprising a number of power consumers.

The power source 14 may be one or more alternators, one or more DC/DC-converters, one or more power batteries or combinations of these. One important aspect in this regard is that the output voltage from the power source 14 can be controlled and regulated.

The second side B comprises a second battery pack 18 and a domain 20 comprising a number of power consumers.

The consumers on the first side A and on the second side B may be performing different functions when the vehicle is operating. Conventionally one side may have consumers that are operating regularly while the other side may have consumers that are used intermittently for shorter time periods. However, when the vehicle is provided with safety critical functions that are dependent on electrical energy for their function, it is important that they are separated so that the operator of the vehicle is able to safely stop and/or steer the vehicle at or to a location out of the way of traffic and other vehicles if the energy supply should be disrupted by for instance a short circuit on one of the sides. These safety critical functions may be electrically operated or assisted brakes, hand brakes, power steering, just to mention a few. Also, when looking at autonomous or semi-autonomous vehicles provided with an array of safety critical functions such as GPS, Light Detection And Ranging (LIDAR), Inertial Measurement Unit (IMU), cameras, Radio Detection and Ranging (RADAR), and the like, it is very important that not all of the functions fail or are rendered inoperable if there is a disturbance in the electrical power supply and these functions should therefore be divided to the two sides.

The electrical power supply circuit 10 is further provided with an overload current breaker 22 arranged between the first side A and the second side B as well as a rectifier 30. The overload current breaker 22 could be a conventional thermal fuse, an electro-mechanical breaker, a magnetic-mechanical breaker, an electronic breaker, just to mention a few. The function of the overload current breaker 22 is to ascertain that the domain 16 on the first side A is not in any way damaged if short circuit events arise on the second side B. As a non-limiting example, for a 24V power supply circuit for vehicles, the overload current breaker may have a nominal value of the breaking threshold current of between 80-125 A. Further, the rectifier 30 is arranged to make sure that current cannot flow from the second side B to the first side A.

The electrical power supply circuit 10 further comprises current measuring devices for obtaining information of in particular charging current $I_{ch}$ for charging the battery 18 on the second side B that passes through the overload current breaker 22. In this context, it is to be understood that the current passing through the overload current breaker, named charging current $I_{ch}$ in this application, may not only be to charge the battery on the second side B, but may also be to provide power to other consumers on the second side B.

One alternative is to arrange a current measuring device 26 in the vicinity of the overload current breaker 22. Such a current measuring device could be of a shunt-type in which a current flows through a resistor with a well-defined resistance and the voltage is measured over the resistor. Another type of current measuring device could be of a magnetic field type, such as a Hall-sensor or a fluxgate sensor.

A further alternative, that would exclude the rectifier, is to use a MOSFET-transistor based solution, wherein current through transistors may be used as a value of the current. In general, there is no specific need for high-accuracy measurement of the charging current as long as it is ascertained that the charging current is relatively safe from the nominal value of the overload current breaker. In many applications, devices 28 are used for measuring the current through the battery pack 18 on the second side B. The measured current through that battery pack 18 could then be used as information for estimating the charging current through the overload current breaker 22. This information could also be added with information regarding the current demands on the consumers in the domain 20 on the second side B for the estimation.

Moreover, a controller 24 is provided with the power supply circuit. The controller 24 is operably connected to the power source 14, for instance via electrical lines. As an alternative, the controller 24 could be an integrated part of the power source 14. In any event, the controller 24 is arranged with processors, storage means and circuits for controlling and regulating the voltage from the power source 14. Further, the controller 24 is operably connected to the current measuring devices 26, 28 included in the power supply circuit and is designed to process information from the current measuring devices. In addition, the storage means of the controller 24 contains information regarding the threshold breaking current value $I_{Threshold}$ of the overload current breaker 22. The processor of the controller 24 is further programmed to compare the information from the current measuring devices with the threshold breaking current value, as will be described below.

According to the application, one aim is to prevent the overload current breaker 22 from breaking due to high current to the side B if the battery 18 is very discharged. On the other hand, the overload current breaker 22 is provided in the power supply circuit for protecting the side A if a short circuiting occurs on the side B. Then the overload current breaker 22 must not be dimensioned such that it does not break or trip during a short circuit or that it does not break or trip fast enough to protect the side A.

Figure 2:
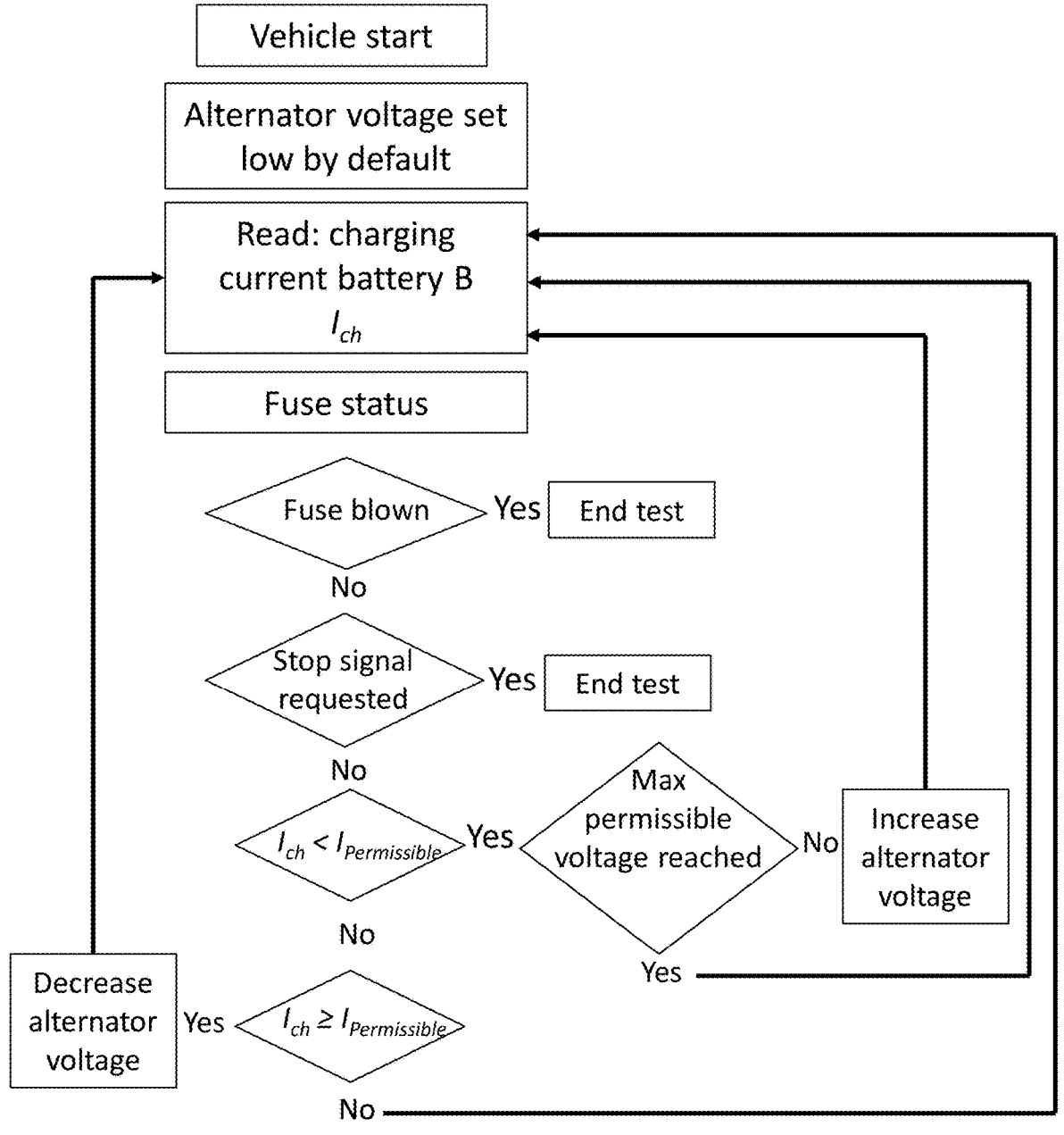
FIG. 2 is a flow sheet of a method for controlling the electrical power supply circuit of FIG. 1.

In order to handle both the charging of a discharged battery back 18 on the second side B and at the same time be sure that the overload current breaker 22 will break during a short circuit, the application is intended to function as follows, see FIG. 2. When a vehicle comprising the power supply circuit of the application is started, the controller 24 will set a low voltage value that the power source 14 provides to the circuit. As an alternative, a low voltage value may be set by default. A voltage at the start may be set so low that no current is flowing from the power source. As an alternative, the voltage may be set to generally correspond to the nominal voltage of the secondary battery pack, defined as the value assigned to a system or circuit of a given voltage class for the purpose of convenient designation.

As the power source 14 is operating, information regarding the charging current $I_{ch}$ through the overload current breaker 22 is gathered by the current measuring devices 26, 28.

If current measuring devices 26 connected to or being a part of the overload current breaker are used, then the information is directly related to the actual charging current through the overload current breaker 22. When this information is transmitted to the controller 24, the controller can perform a direct comparison with the stored threshold current value $I_{Threshold}$ of the overload current breaker 22.

On the other hand, if current measuring devices 28 are connected to the battery pack 18 on the second side B, the information from these measuring devices 28 will be handled by the controller 24 with a compensation factor because all current through the overload current breaker 22 may not be supplied to the battery pack 18 on the second side B only, but also to consumers in the domain 20 on the B side.

Regardless of the actual setup with current measuring devices, the comparison made in the controller will determine the voltage level from the power source 14. As long as the current through the overload breaker 22 is below the threshold value, the voltage level can be increased to proper charging values. The voltage level can only be increased to a maximum charging voltage permissible for the battery packs in order not to ruin the battery packs by overcharging them. The controller is in this regard provided with stored data and data from for instance temperature sensors, which data is used for determining the maximum permissible charging voltage. If the information from the current measuring devices 26, 28 indicates that the current through the overload breaker has increased such that it is close to, the same as or above, the threshold value, the controller 24 decreases the voltage level from the power source 14.

In this regard, a value can be determined and set in the controller, at which value the controller decreases the voltage level from the power source, i.e. a maximum permissible current value, $I_{Permissible}$. The controller could be set such that the maximum permissible current value is somewhat below the threshold current value, in order to minimize the risk of the overload breaker tripping. It is however also possible that the maximum permissible current value is set equal to the threshold current, or even somewhat above the threshold current, depending for instance on the type of overload current breaker and how fast or slow it reacts on overload currents.

The process is continuous as long as the vehicle is running, which ensures that the current through the overload current breaker 22 will not reach levels that may cause the overload current breaker 22 to break. When the operation of the vehicle is stopped, a stop signal is generated from the vehicle, whereby the voltage control of the power source 14 is stopped, and as mentioned above, the default voltage value may be set low again.

Figure 3:
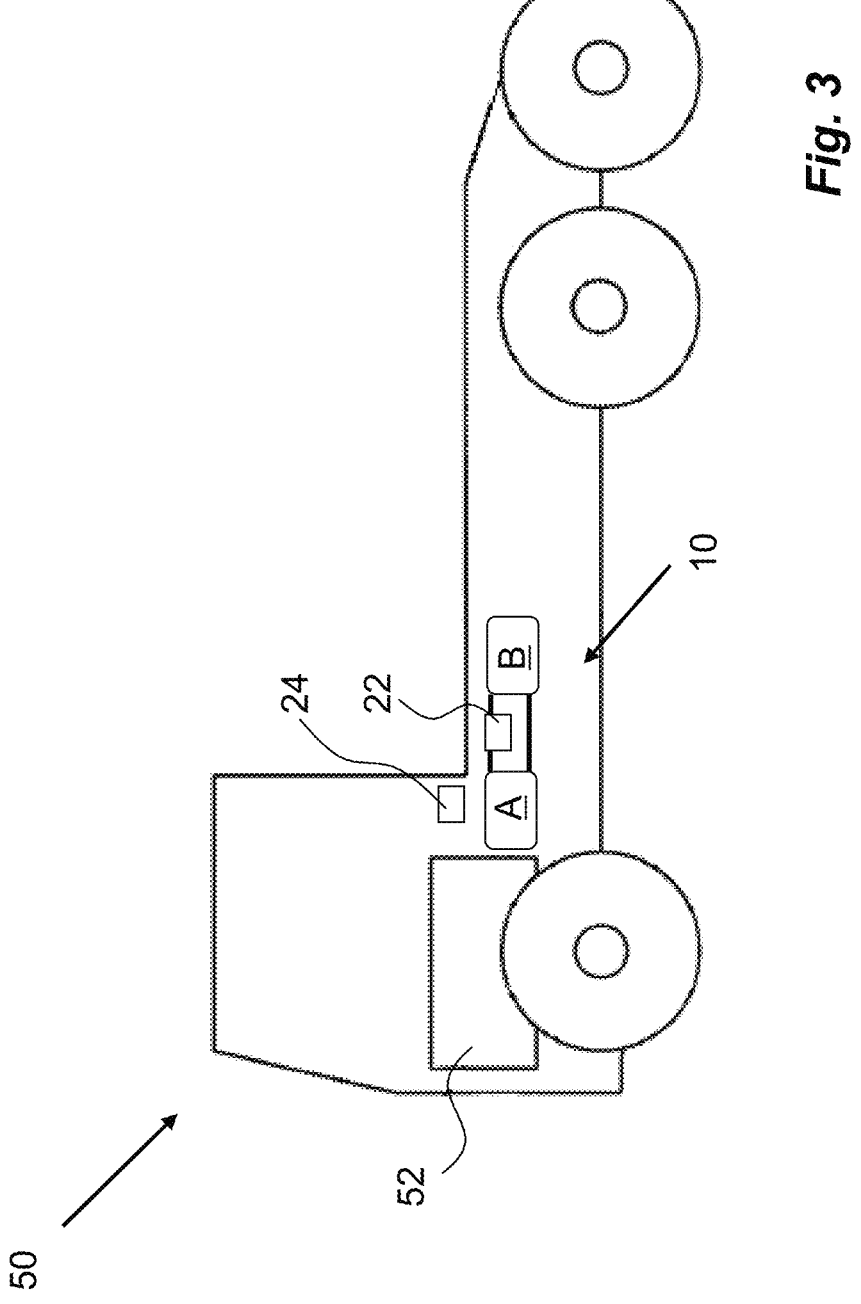
FIG. 3 is a schematic view of a vehicle comprising a power supply circuit according to the present application.

FIG. 3 schematically shows a vehicle 50 comprising the power supply circuit 10 according to the application. The vehicle 50 may for example be a bus, a truck, a heavy truck or a car. In this regard, the vehicle 50 may have a drive train 52 comprising a combustion engine only, a combustion engine assisted by one or more electrical motors, such as a hybrid vehicle or only electrical motors, a battery powered electric vehicle.

It is to be understood that the embodiment described above and shown in the drawings is to be regarded only as a non-limiting example that may be modified in many ways within the scope of the patent claims.

The invention claimed is:

1. A power supply circuit of a vehicle, which power supply circuit comprises:
   a first side comprising a power source, a first battery pack and first power consumers,
   a second side connected in series with the first side, the second side comprising a second battery pack and second power consumers,
   an overload current breaker provided between the first and the second side, said overload current breaker having a pre-determined threshold breaking current value, at which value the circuit is broken;
   a controller connected to said power source for regulating voltage from said power source, the controller being provided with said threshold breaking current value, the controller further being operatively connected to devices providing information related to a current through said overload current breaker,
   said controller being dimensioned and configured to:
   determine a maximum permissible charging current value in relation to the threshold breaking current value;
   set a low voltage from said power source for charging said second battery pack at activation of said power source;
   monitor, with the information from the devices, the charging current through said overload current breaker to the second battery pack and comparing the charging current with the maximum permissible charging current;
   increase the voltage of the power source when the charging current is below the maximum permissible charging current; and decrease the voltage of the power source when the charging current is the same as or above the maximum permissible current.

2. A power supply circuit according to claim 1, wherein said maximum permissible current value ($I_{Permissible}$) is set below said threshold current value ($I_{Threshold}$).

3. A power supply circuit according to claim 1, wherein said maximum permissible current value ($I_{Permissible}$) is set the same or above said threshold current value ($I_{Threshold}$).

4. A power supply circuit according to claim 1, wherein said controller is provided with data regarding the maximum permissible charging voltage and increases the voltage (V) of the power source up to the maximum permissible charging voltage.

5. A power supply circuit according to claim 1, wherein the devices providing information relating to the current through the overload current breaker comprise a shunt-based measuring device or a magnetic field-based measuring device connected to the circuit in the vicinity of the overload current breaker.

6. A power supply circuit according to claim 5, further comprising a rectifier connected in series with said overload current breaker, allowing current only to flow towards the second side.

7. A power supply circuit according to claim 1, wherein the devices providing information through the overload current breaker comprise a MOSFET-transistor based device, also allowing current only to flow towards the second side.

8. A power supply circuit according to claim 1, wherein the devices providing information through the overload current breaker comprise devices capable of measuring current to the second battery pack.

9. A power supply circuit according to claim 8, wherein said controller comprises information regarding the current demand of the second consumers and wherein the controller is arranged to estimate the current through the overload current breaker based on the current demand and the current to the second battery pack.

10. A power supply circuit according to claim 1, wherein said overload current breaker comprises any of thermal breaker, mechanical breaker, electronic breaker or combinations thereof.

11. A power supply circuit according to claim 1, wherein the power supply comprises one or several of alternators, DC/DC-converters, batteries or combinations thereof.

12. A method for controlling a power supply circuit of a vehicle, which power supply circuit comprises:

a first side comprising a power source, a first battery pack (and first power consumers, a second side connected in series with the first side, the second side comprising a second battery pack and second power consumers, an overload current breaker provided between the first and the second side, said overload current breaker having a pre-determined threshold breaking current value, at which value the circuit is broken;

the method comprising the steps of:

determining a maximum permissible charging current value in relation to the threshold breaking current value;

setting a low voltage from the power source for charging said second battery pack at activation of said power source;

obtaining information related to a charging current over said overload current breaker;

monitoring, with the information, the charging current ($I_{ch}$) through the overload current breaker (22) to the second battery pack (18) and comparing the current ($I_{ch}$) with the maximum permissible charging current ($I_{Permissible}$);

increasing the voltage (V) of the power source when the charging current ($I_{ch}$) is below the maximum permissible charging current ($I_{ch} < I_{Permissible}$); and decreasing the voltage (V) of the power source when the charging current ($I_{ch}$) is the same as or above the maximum permissible charging current ($I_{ch} > I_{Permissible}$).

13. The method according to claim 12, wherein increasing the voltage of the power source is performed up to a maximum permissible charging voltage.

14. A controller for controlling a power supply circuit of a vehicle arranged to perform the method of claim 12.

15. A computer program product comprising instructions which, when the program is executed by a computer, cause the computer to carry out the method according to claim 12.

16. A computer-readable storage medium comprising instructions which, when executed by a computer, cause the computer to carry out the method according to claim 12.

17. A vehicle comprising the power supply circuit according to claim 1.

* * * * *